C. E. LEIGH & F. CARROLL.
BURNER.
APPLICATION FILED AUG. 19, 1912.

1,090,402.

Patented Mar. 17, 1914.
2 SHEETS—SHEET 1.

WITNESSES
H. E. Lambert.
G. E. Sorensen.

INVENTORS
CHARLES E. LEIGH
FRANK CARROLL
BY
ATTORNEYS

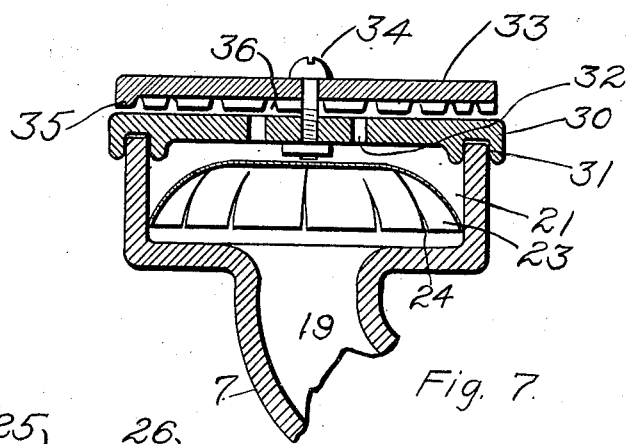
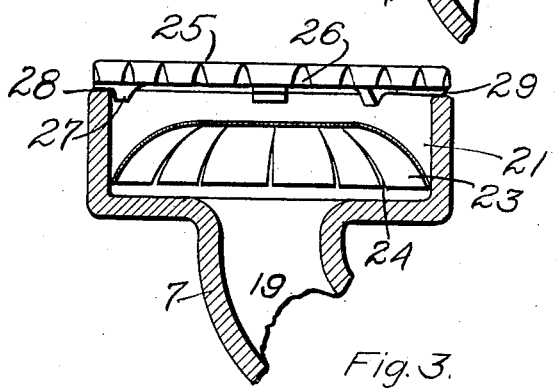
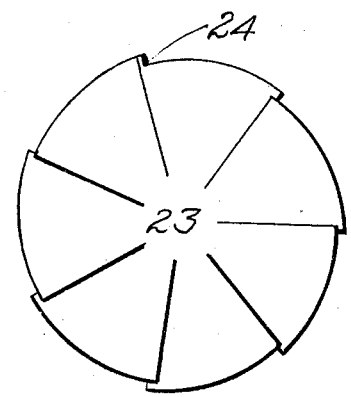
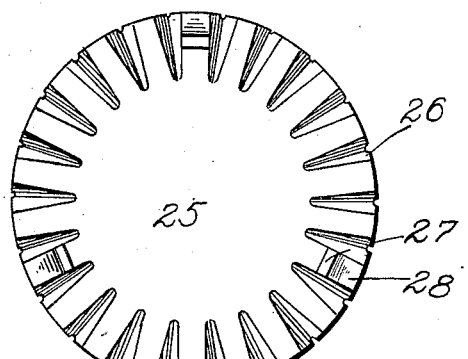

UNITED STATES PATENT OFFICE.

CHARLES E. LEIGH AND FRANK CARROLL, OF CEDAR RAPIDS, IOWA.

BURNER.

1,090,402.  Specification of Letters Patent.  Patented Mar. 17, 1914.

Application filed August 19, 1912.  Serial No. 715,810.

*To all whom it may concern:*

Be it known that we, CHARLES E. LEIGH and FRANK CARROLL, of Cedar Rapids, Lynn county, Iowa, have invented certain new and useful Improvements in Burners, of which the following is a specification.

Our invention relates to oil burners and the object of the invention is to provide an apparatus in which the oil will be rapidly and effectually vaporized for the production of a blue flame.

A further object is to provide a burner which will burn steadily and produce an intense, even heat for cooking purposes.

A further object is to provide a burner which can be easily and quickly applied to a cook stove and will have none of the disagreeable odors frequently incident to burners of this type.

Other objects of the invention will appear from the following detailed description.

The invention consists generally in various constructions and combinations, all as hereinafter described and particularly pointed out in the claims.

Figure 1:
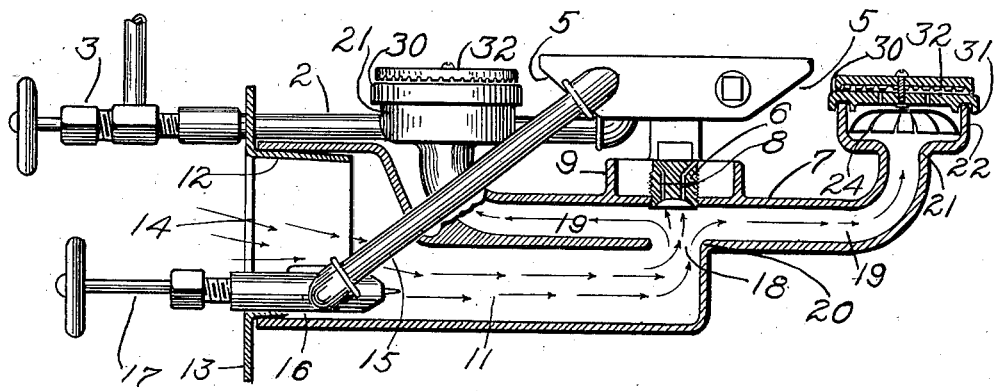
Figure 2:
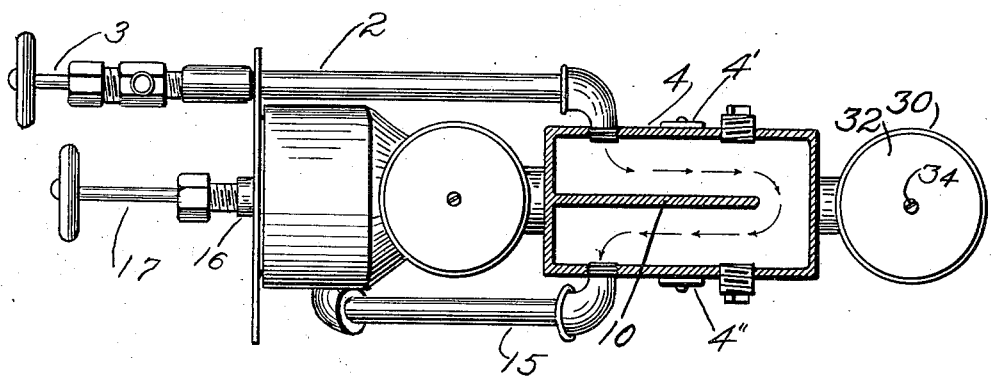

In the accompanying drawings forming part of this specification, Figure 1 is a sectional view through a burner embodying our invention, Fig. 2 is a horizontal sectional view showing the construction of the retort. Fig. 3 is a detail sectional view of the burner proper, showing the removable cap thereon. Fig. 4 is a bottom view of the cap, Fig. 5 is a view of the spreader interposed between the cap of the burner and the supply pipe. Fig. 6 is a sectional view of the spreader, Fig. 7 is a sectional view of the burner, showing a modified form of cap thereon.

In the drawing, 2 represents a supply pipe communicating with a source of oil supply and having a controlling valve 3. The pipe 2 communicates with a retort 4. This retort has a flat top and is preferably beveled on its under side at 5 to expose a larger surface to the flame of the retort heating nozzle 6 beneath. This nozzle is mounted in the upper wall of a casting 7 and has ports 8 therein and a concave under surface, as indicated in Fig. 1. A flange 9 incloses this nozzle and is spaced therefrom. The nozzle is located directly beneath the retort and a suitable distance therefrom and the oil is ignited in the cup formed by the flange and nozzle to heat the walls of the retort and vaporize the oil therein for the burners. The retort is preferably provided with an internal wall or partition 10, which will compel the oil flowing therethrough to follow a tortuous passage and expose it for a considerable time to the heated walls of the retort so that generation of the vapor or gas will be more rapid and complete. The retort may be mounted in any suitable manner on the casting, but we prefer to provide brackets 4' between which the retort is movably secured by screws 4'' or any suitable means. This is a convenient construction to facilitate the assembling of the parts of the burners and allow the removal of the retort without disturbing the other parts or connections of the burners.

In the lower part of the casting 7 is a mixing chamber 11 having an open end adapted to receive a flange 12 on a plate 13. This plate has an air intake opening 14 communicating with the mixing chamber and we prefer to proportion the air and gas feed in a ratio of three to one, as we have found the best results can be obtained in this way. That is, the gas will burn more evenly and freely and without danger of smoking or going out. This plate 13 has a hole therethrough to receive the supply pipe 2 and is adapted to fit into the opening in the stove leading to the combustion chamber to allow the burner to be thrust into the chamber of the stove with the plate 13 substantially flush with the stove walls. Generally the burner will be mounted on the door of the stove, but it may be fitted into the combustion chamber in any suitable way, depending upon the style of the stove in which it is used.

A pipe 15 leads from the retort on the opposite side thereof from the supply pipe to a nozzle 16, which is also mounted in the plate 13 and provided with a regulating valve 17. This nozzle projects into the mixing chamber and delivers the vapor from the retort at a point where it will be thoroughly mixed with air in suitable proportions. A port 18 leads from the mixing chamber 11 to the burner feed ducts 19. The diameter of the mixing chamber with respect to the diameter of the ducts is approximately in the ratio of two to one, as we have found this proportion best suited to deliver the vapor in proper quantities to the burners to maintain a uniform, continuous flame.

The port 18 is located directly beneath the nozzle 8 so that a sufficient amount of the vapor will enter the nozzle to maintain its flame, keep the retort hot and continue the vaporization of the oil until such time as the supply is cut off. The port 18 has preferably a square shoulder 20 on one side which will operate to deflect the vapor upwardly and cause a uniform supply to pass through each of the ducts 19. The walls of the ducts are turned upwardly at each end of the retort and terminate in cups 21, open at the top and having walls in the form of annular flanges which inclose deflectors or spreaders 23, preferably of sheet metal, having radial slits 24 therein forming a series of wings which are bent downwardly with their radial edges lapping by one another, as indicated in Fig. 5, and spaced apart slightly to allow the gas to pass between them and deflect the gas to the walls of the cup. A plate 25, preferably of cast metal, is provided on its under face with a series of radial depressions or grooves 26 arranged at suitable intervals, and between these grooves we provide depending lugs 27 which extend down into the cup on the inside thereof and bear against the flanged walls thereof. These lugs have surfaces 28 which rest on the upper edge of the flange of the burner and raise the plate 25 sufficiently above the flange to provide a narrow crack 29 between the plate to deflect the gas outwardly and the crack is of sufficient width to permit the passage of the gas and form a circular blue flame the full circumference of the burner. We have found that by providing this crack between the plate and the burner wall that the vapor will burn evenly and that there will be no danger of its being smothered or put out.

In Fig. 7 we have shown a modified construction of the burner plate, which consists in providing a lower plate 30 having an annular recess or groove 31 to receive the wall of the burner, and holes 32 through which the vapor may pass from the feed duct. The plate 33 is secured to the plate 30 by a centrally arranged bolt 34 and is provided with a series of depending peripheral lugs or projections 35 having passages 36 between them, a suitable space from the plate 30 to allow the passage of the burner flame. This burner plate or cup will operate substantially in the same manner as the plate shown in Fig. 3 to form a continuous circular flame for the burner.

We claim as our invention:

1. A device of the class described comprising a casting having a mixing chamber and vapor ducts therein, burners communicating with said ducts, brackets mounted on said casting between said burners, a retort seated on said brackets and having an oil supply pipe and a vapor pipe discharging into said mixing chamber, and a nozzle arranged beneath said retort and communicating with said vapor ducts.

2. A device of the class described comprising a casting having a mixing chamber therein provided with an air intake opening at one end and a discharge port near its opposite end, vapor ducts communicating at one end with said port, burners communicating with the other ends of said ducts and equi-distant, substantially, from said discharge port, whereby a substantially equal volume of vapor will be delivered to each burner, a retort arranged between said burners and communicating with a source of oil supply, a retort burner arranged below said retort, and communicating with said ducts and located above and substantially opposite the discharge port of said mixing chamber, whereby a portion of the gas entering said ducts will pass to said retort burner.

3. A device of the class described comprising a casting having a mixing chamber therein and vapor ducts communicating with said mixing chamber, said chamber having a comparatively large air intake opening at one end of said casting, a flanged plate having an opening therein fitting within the opening leading to said mixing chamber, and adapted to be mounted in a stove door, and burners communicating with said vapor ducts, a retort having an oil supply pipe and a vapor feed pipe communicating therewith, means for regulating the flow of gas from said vapor feed pipe to said mixing chamber, and a nozzle communicating with said mixing chamber and disposed beneath said retort.

4. A device of the class described comprising a casting having a mixing chamber therein provided with an air intake opening, and a discharge port, vapor ducts in communication with said mixing chamber through said port, said port having a square shoulder on one side to direct the vapor equally to the end portions of said ducts, burners communicating with said ducts, a retort disposed between said burners, a burner arranged opposite said port beneath said retort, an oil supply pipe communicating with said retort and a vapor feed pipe leading from said retort to said mixing chamber.

In witness whereof, we have hereunto set our hands this 12″ day of August, 1912.

CHARLES E. LEIGH.
FRANK CARROLL.

Witnesses:
Vesta Moses,
Garnet L. Avery.